United States Patent
Reid

(10) Patent No.: US 10,858,274 B2
(45) Date of Patent: Dec. 8, 2020

(54) WASTEWATER DETOXIFICATION METHOD AND SYSTEM

(71) Applicant: John H. Reid, Fredericksburg, VA (US)

(72) Inventor: John H. Reid, Fredericksburg, VA (US)

(*) Notice: Subject to any disclaimer, the term of this patent is extended or adjusted under 35 U.S.C. 154(b) by 365 days.

(21) Appl. No.: 15/933,116

(22) Filed: Mar. 22, 2018

(65) Prior Publication Data
US 2018/0273413 A1    Sep. 27, 2018

Related U.S. Application Data

(60) Provisional application No. 62/474,990, filed on Mar. 22, 2017.

(51) Int. Cl.
*C02F 1/24*     (2006.01)
*C02F 9/00*     (2006.01)
(Continued)

(52) U.S. Cl.
CPC ............... *C02F 9/00* (2013.01); *C02F 1/24* (2013.01); *C02F 1/32* (2013.01); *C02F 1/50* (2013.01); *C02F 1/52* (2013.01); *C02F 1/5245* (2013.01); *C02F 1/56* (2013.01); *C02F 1/66* (2013.01); *C02F 1/70* (2013.01); *C02F 1/76* (2013.01); *C02F 3/00* (2013.01); *C02F 3/02* (2013.01);
(Continued)

(58) Field of Classification Search
CPC ...... C02F 1/24; C02F 9/00; C02F 1/50; C02F 1/66; C02F 1/32; C02F 1/52; C02F 3/00; C02F 1/70; C02F 1/5245; C02F 1/76; C02F 1/56; C02F 3/28; C02F 3/02; C02F 2101/16; C02F 201/12; C02F 2101/301; C02F 2101/36; C02F 2301/046; C02F 2101/105; C02F 2103/22; C02F 2103/32; C02F 2303/04; C02F 2101/34; C02F 2305/04; C02F 2103/20; Y02W 10/15
USPC .......................................................... 210/705
See application file for complete search history.

(56) References Cited

U.S. PATENT DOCUMENTS 5,139,662 A * 8/1992 Ozawa ................ B03D 1/1418
                                                        210/221.2

FOREIGN PATENT DOCUMENTS

EP              243544 A1 *  11/1987

* cited by examiner

*Primary Examiner* — Thomas M Lithgow
(74) *Attorney, Agent, or Firm* — Walter Ottesen, P.A.

(57) ABSTRACT

Processes, methods, and systems are disclosed for treatment and removal of peracetic acid (PAA), quaternary ammonia compounds (Quat), hydrogen peroxide, chlorine, chloramines, chlorinated organics, surfactants, and other such chemicals from wastewater pretreatment processes typically employed by livestock processing, meat processing, and/or food processing plants that generate wastewater outflows. Treatment and/or removal of these chemicals commonly found in such wastewater allows the further treatment of the wastewater downstream by commonly employed biological wastewater treatment processes such as anaerobic, anoxic, or aerobic suspended growth activated sludge processes; anaerobic, anoxic, or aerobic fixed growth, IFAS, moving bed bioreactor (MBBR) or Membrane Bioreactor (MBR) processes; anaerobic lagoons; anaerobic fluidized bed or fixed bed processes; and/or, anaerobic sludge digestion processes commonly employed for biochemical oxygen demand (BOD) removal, ammonia removal, total nitrogen removal, and/or phosphorus removal.

18 Claims, 9 Drawing Sheets

(51) Int. Cl.
*C02F 1/50* (2006.01)
*C02F 101/16* (2006.01)
*C02F 101/12* (2006.01)
*C02F 101/30* (2006.01)
*C02F 101/36* (2006.01)
*C02F 1/66* (2006.01)
*C02F 101/10* (2006.01)
*C02F 1/32* (2006.01)
*C02F 103/22* (2006.01)
*C02F 103/32* (2006.01)
*C02F 1/52* (2006.01)
*C02F 3/00* (2006.01)
*C02F 101/34* (2006.01)
*C02F 1/70* (2006.01)
*C02F 1/76* (2006.01)
*C02F 3/28* (2006.01)
*C02F 103/20* (2006.01)
*C02F 3/02* (2006.01)
*C02F 1/56* (2006.01)

(52) U.S. Cl.
CPC .......... *C02F 3/28* (2013.01); *C02F 2101/105* (2013.01); *C02F 2101/12* (2013.01); *C02F 2101/16* (2013.01); *C02F 2101/301* (2013.01); *C02F 2101/34* (2013.01); *C02F 2101/36* (2013.01); *C02F 2103/20* (2013.01); *C02F 2103/22* (2013.01); *C02F 2103/32* (2013.01); *C02F 2301/046* (2013.01); *C02F 2303/04* (2013.01); *C02F 2305/04* (2013.01); *Y02W 10/15* (2015.05)

WASTEWATER DETOXIFICATION METHOD AND SYSTEM

CROSS-REFERENCE TO RELATED APPLICATION

This application claims priority to and the benefit of U.S. Provisional Patent Application Ser. No. 62/474,990, filed Mar. 22, 2017, entitled, "Detoxifier Process," which application is incorporated herein by reference in its entirety.

BACKGROUND

The US economy depends heavily on the rearing, husbandry, maintenance, slaughter, processing, and packaging of livestock for food and other raw materials. The meat packing industry is tasked with safely processing, packaging, and distribution of animal products from cattle, pigs, sheep, fowl, and other domesticated livestock in a clean and hygienic environment. Processing plants that are instrumental in preparing these products, such as poultry processing plants, cattle processing plants, cheese and dairy plants, and the like, implement many technologies for purification and decontamination of water sources both during processing and before release of wastewater from the plants. Particularly, water and other aqueous byproducts released by such animal processing plants often contain various chemicals utilized in the decontamination process at the plant. Such chemicals can cause further complications in downstream processing of the wastewater prior to release back into the waterways and general water table system, especially when those downstream wastewater processing systems employ biological processing or filtration steps. Thus, the very chemicals such plants employ can cause two different problems: contamination of wastewater that requires further cleanup before release, and inhibition of commonly employed wastewater treatment systems that rely on biological processing to decontaminate such wastewater.

Livestock processing plants often employ various commercially available decontamination systems to treat their processing equipment, such as peracetic acid (PAA), quaternary ammonia compounds (commonly referred to in the field as simply "Quat"), hydrogen peroxide, chlorine, chloramines, chlorinated organics, surfactants, and other such chemicals. Further, such processing plants that use food breading, marinating, and cooking processes, or meat rendering plants that process meat by-products into protein feed products, typically use chemical substances in their processing plant to prevent, control, or inhibit the *salmonella* bacteria and/or other pathogenic bacteria and organisms in such food or feed products or on the processing equipment and/or livestock housing. Chemicals used in such food processing plants for plant clean-up, to disinfect equipment, or sanitation shifts, or, for bacteria or pathogen control or other quality control requirements are typically biocide substances such as chlorine, peroxyacetic acid (PAA), hydrogen peroxide, peracetic acid, quaternary ammonia, surfactants, cleaning chemicals, foaming agents, and the like.

These chemicals are toxic to industrial wastewater treatment systems and their release from processing plants into the general water stream should be avoided. (See, Young, J. C., "Impact of Cleaning and Disinfecting Agents on Biological Treatment Processes," *Proc. Indust. Waste Technical Conf.*, Water Environment Federation, Charleston, S.C., August, 2001; Durham et al., "Toxic Impact of Commercial Biocides on Industrial Wastewater Treatment Systems," *Proc. WEFTEC,* 2009). Elevated concentrations of chlorine, chloramines, chlorinated organics, peracetic acid (PAA), hydrogen peroxide, quaternary ammonia (Quat), surfactants, and some cleaning chemicals are well known to be toxic to or inhibitory to biological anaerobic processes used for biochemical oxygen demand (BOD) removal and bio gas production, and, to biological aerobic or anoxic processes used for Total Kjeldahl Nitrogen (TKN) and ammonia removal in wastewater treatment systems found in livestock, meat, and/or food processing plants.

Thus, such chemicals can inhibit downstream biological wastewater treatment processes typically employed by such plants. That is, while the use of these chemicals in the food processing industry is necessary and crucial in the clean-up shift operations and product quality control operations of these processing plants, their use is detrimental to the further cleanup of wastewater when those cleanups employ biological wastewater treatment processes used in on-site industrial wastewater treatment systems or in municipal sewage treatment plants. Therefore, what is needed, and what is provided herein, are processes, methods, and systems that address this problem by utilizing a wastewater treatment system that removes, inactivates, and/or stabilizes such chemical compounds commonly found in livestock processing, meat processing, and food processing wastewater.

SUMMARY

Provided are methods and processes for wastewater treatment. The wastewater from livestock farms and processing plants, animal processing plants, and the like are typically contaminated with toxins and biocides that are incompatible with downstream biological treatment processes commonly employed by governments and municipality treatment systems. To combat this such wastewater is often treated with neutralization chemicals. However, such neutralization chemicals lead to problems with coagulation and precipitation of an abundance of solids that require additional expensive and time-consuming processing.

Therefore, to solve these problems, provided are methods and processes for treating such contaminated wastewater, which comprise providing a wastewater outflow from a livestock, animal, or food processing plant, wherein the wastewater outflow comprises one or more contaminants, and wherein the contaminants are peracetic acid (PAA), quaternary ammonia compounds (Quat), hydrogen peroxide, chlorine, chloramines, chlorinated organics, surfactants, and combinations thereof, injecting the wastewater outflow into a floc tube, adding a coagulant and/or a flocculant to the flock tube, directing the effluent from the floc tube to a Dissolved Air Flotation (DAF) cell, adding one or more neutralization chemicals to the DAF cell effluent, directing the DAF cell effluent back to the DAF cell, wherein a portion of the DAF cell effluent is a clarified wastewater product, wherein the amount of contaminants in the wastewater is higher than the amount of contaminants present in the clarified wastewater product, and wherein little or no precipitation or coagulation occurs in the DAF cell effluent as a result of addition of the one or more neutralization chemicals.

Further provided are wastewater treatment systems that comprise a wastewater inlet, a floc tube, a Dissolved Air Flotation (DAF) cell, a recycle pressurization pump, and optionally a contactor pipe or contactor tank, wherein the DAF cell effluent pipe is adapted to accept neutralization chemicals, and wherein the DAF cell effluent pipe is adapted to direct flow of wastewater back to the DAF cell immediately upstream of the DAF cell.

DETAILED DESCRIPTION

Figure 1A:
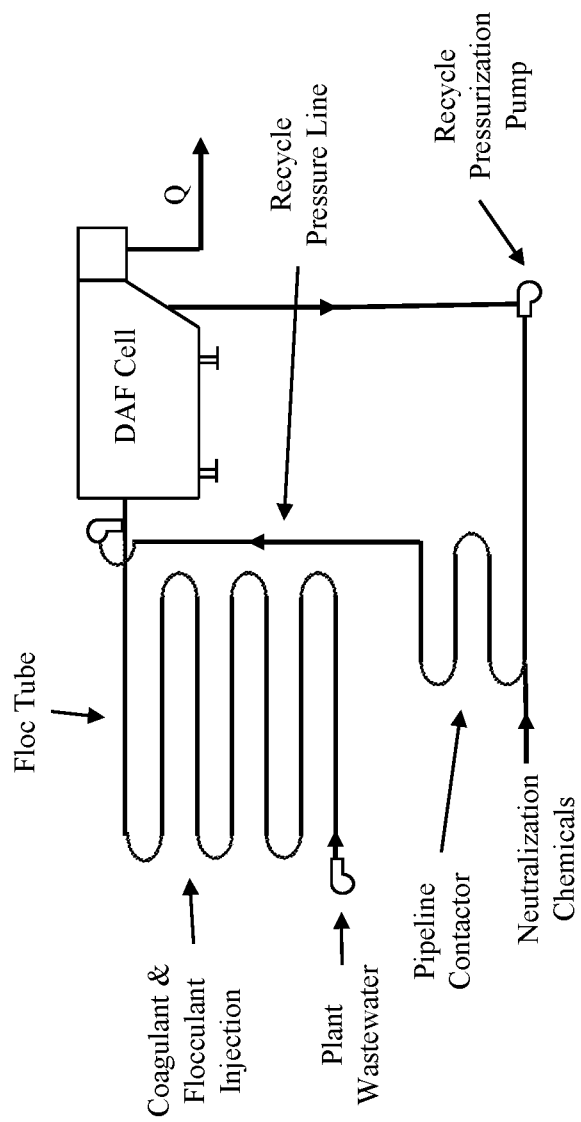
FIG. 1A is a schematic representation of an embodiment of the wastewater treatment process and system comprising a pipeline contactor provided in the recycle pressurization line for dosing, thoroughly mixing, and reaction of wastewater treatment chemicals with a pressurized Dissolved Air Flotation (DAF) cell recycle flow that is pumped and recycled back into the inlet end of the DAF cell.

It is to be understood that the following detailed description is provided to give the reader a fuller understanding of certain embodiments, features, and details of aspects of the invention, and should not be interpreted as a limitation of the scope of the invention.

Definitions

Certain terms used throughout this disclosure are defined hereinbelow so that the present invention may be more readily understood. Additional definitions are set forth throughout the disclosure.

Each term that is not explicitly defined in the present application is to be understood to have a meaning that is commonly accepted by those skilled in the art. If the construction of a term would render it meaningless or essentially meaningless in its context, the term's definition should be taken from a standard dictionary.

The use of numerical values in the various ranges specified herein, unless expressly indicated otherwise, are considered to be approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

As used herein, the singular forms "a," "an," and "the" include plural references unless the context clearly dictates otherwise. Thus, e.g., references to "the method" includes one or more methods, and/or steps of the type described herein and/or which will become apparent to one of ordinary skill in the art upon reading this disclosure and so forth. As used herein, the plural forms include singular references unless the context clearly dictates otherwise. Thus, e.g., references to "the methods" includes one or more methods, and/or steps of the type described herein and/or which will become apparent to one of ordinary skill in the art upon reading this disclosure and so forth.

As used herein, "about" means within a statistically meaningful range of a value such as a stated concentration range, time frame, length, capacity, rate, temperature, or pressure. Such a range can be within an order of magnitude, typically within 20%, more typically still within 10%, and even more typically within 5%, of a given value or range. Further, whenever a range is recited within this application, every whole number integer within the range is also contemplated as an embodiment of the invention.

As used herein, Dissolved Air Flotation (DAF) is a wastewater treatment process that clarifies wastewater by removal of suspended matter such as oils, grease, fats, or solids by dissolving air into the water under pressure, and then releasing the air at atmospheric pressure in a flotation tank basin. The released air forms bubbles that adhere to the suspended matter causing it to float to the surface where it can be skimmed off by various known skimmer devices. Such DAF cell methodologies are commonly employed to clarify wastewater effluents from oil refineries, chemical plants, natural gas processing plants, paper mills, and animal, livestock, and food processing plants.

Peroxyacetic acid (PAA) is also known as peracetic acid or ethaneperoxic acid and exists with water in equilibrium with acetic acid (ethanoic acid) and hydrogen peroxide.

As used herein, livestock means any of a number of known farm animals raised for conservation and repopulation, for food, for use as pets, or for use in production of consumable products such as leather, jewelry, fertilizer, labor, fur, milk, wool, meat, eggs, and the like. Livestock animals include, but are not limited to, cattle, pigs, mice, rats, hamsters, chickens, goats, fish, fowl such as ducks, alpacas, bison, camels, ostrichs, deer, elk, guinea pigs, llamas, horses, rabbits, sheep, and yaks.

Quaternary ammonium compounds (Quat) include, for instance, benzalkonium chloride and are cationic surfactants and disinfectants. They generally contain long alkyl chains and are used as antimicrobials and disinfectants. Exemplary Quat compounds include benylalkonium chloride, benzethonium chloride, methylbenzethonium chloride, cetylalkonium chloride, dofanium chloride, tetraethylammonium bromide, didecyldimethylammonium chloride (DDAC), domiphen bromide. Without wishing to be bound by any specific theory, it is believed that the Quat compounds act by disrupting the cell membrane of bacteria and other microbes infecting water systems and processing equipment in animal and food processing plants.

As used herein, integrated fixed-film activated sludge (IFAS) processes means a process by which conventional activated sludge systems are retrofitted to extend capacity. IFAS systems are a variation of the MBBR process and are compatible with fine bubble aeration systems and plug flow and complete mix configurations. IFAS systems comprise both biofilm carrier technology and conventional activated sludge technology enabling increased volume productivity without increasing mixed liquor suspended solids levels. Biofilm support media include, for instance, fixed bed media held in frames, loose biofilm carrier particles, or sponge-type MBBR media or cartridges, etc. (See, for instance Mannina et al., "Nitrous oxide from integrated fixed-film activated sludge membrane bioreactor: Assessing the influence of operational variables," Bioresource Tech., 247: 1221-1227, 2018).

As used herein, membrane bioreactor (MBR) means a combination of a membrane process such as microfiltration or ultrafiltration and a biological wastewater treatment process. Such systems can be internal/submerged, where membranes are immersed in the biological reactor, or external/sidestream configurations where membranes are a separate unit process that requires an intermediate pumping step for access. (See, Jedd, S., "The MBR Book, Second Edition: Principles and Applications of Membrane Bioreactors for Water and Wastewater Treatment" Oxford: Elsevier Ltd., 2nd Ed., 2011, ISBN-13: 978-0080966823).

As used herein, a moving bed biofilm reactor (MBBR) is a type of wastewater treatment process or system that comprises an aeration tank (similar to an activated sludge tank) with carriers that provide surfaces for biofilm growth, and a sieve on the outlet of the tank to prevent loss of the plastic carriers. The aeration system in the aeration tank mixes the biofilm surfaces in the tank to provide good contact with wastewater. (See, Ødegaard et al., "A new moving bed biofilm reactor—applications and results," Water Science and Technology, 29 (10-11): 157-165, 1994).

As used herein, biochemical oxygen demand (BOD) means the amount of dissolved oxygen that must be present in water in order for aerobic microorganisms to decompose the organic matter present in a water sample at a predetermined temperature over a specific period of time, such as the number of milligrams of oxygen consumed per liter of sample during 5 days of incubation at 20° C. BOD is often used as a gauge of the effectiveness of a wastewater treatment system. BOD is similar to chemical oxygen demand (COD), except that COD is a measure of everything that can be chemically oxidized under the same conditions, rather than just the amount of biodegradable organic matter that can be decomposed.

Flocculants, as used herein, act to gather particles that have become destabilized in the wastewater stream and cause them to precipitate. Various polymers are known to act as flocculants. Suitable flocculants are well known in the wastewater treatment industry and commercially available from, for example, ChemTreat, Glen Allen, Va., US. Exemplary anionic flocculants include copolymers of acrylamide and acrylic acid, and possess a negative ionic charge. Such anionic flocculants are believed to function by binding to residual cationic charges on coagulants adsorbed to coagulated colloids in wastewater. Exemplary cationic flocculants include, but are not limited to, copolymers of N,N-dimethylaminoethyl acrylate methyl chloride quaternary (AETAC), N,N-dimethylaminoethyl methacrylate methyl chloride quaternary (METAC), and acrylamide. Cationic flocculants are believed to function by coagulating by action of their positive ionic charges and flocculating due to their high molecular weight.

A floc tube, pipeline flocculator, or flocculation tube, as used herein, is a plug-flow reactor-type coagulant and flocculation system that often comprises a coiled pipeline for plug flow mixing and extended contact time for the wastewater to be treated and to provide time for exposure to and mixing with dosed chemicals, such as flocculants, coagulants, upstream of the DAF cell and prior to various wastewater separation processes. Mixing of wastewater in floc tubes is thought to primarily occur in the floc tube turns, constrictions, and expansions. The restriction and expansion of pipe size is believed to create turbulence and eddies in the flow that, when combined with changes in flow direction and rate at the elbows of the floc tube, disrupt the velocity gradient and flow patterns of the wastewater running through the tube. This flow action achieved by a floc tube provides radial mixing and axial back-mixing.

A coagulant, as used herein, refers to chemical compounds or additives to wastewater treatment regimes to consolidate, i.e. bind together, suspended solids into larger particles for easy removal by physical separation techniques such as filtration and/or skimming. Exemplary coagulants include, but are not limited to, aluminum chloride, ferric chloride, ferric sulfate, aluminum sulfate solution, polyaluminum chloride, bentonite clay, and other metal salts of titanium and zirconium. Not wishing to be bound by any specific theory, it is thought that the cationic metal ion of the coagulant acts to neutralize the negatively charged electric double layer of colloids formed from waste particles.

As used herein, a Pipeline Contactor (PC) is a coiled pipeline that provides extended pipe length in short spaces. Pipeline contactors commonly are employed upstream of DAF cells for mixing wastewater and chemicals used to treat wastewater.

Wastewater Detoxification Processes, Methods, and Systems

The purpose of the described processes and systems is to provide an economical and effective solution for rapidly and economically treating livestock, meat, and/or food processing wastewater that contains toxic substances that can be inhibitory to downstream biological wastewater treatment processes. The processes, methods, and systems provided herein act to reduce, remove, inactivate, stabilize, and/or eliminate these toxic substances that are commonly found in such wastewater effluents from such processing plants such that they are no longer toxic and/or no longer substantially or markedly or detectably inhibit downstream biological wastewater treatment processes. Such toxic substances include, but are not limited to, peracetic acid (PAA), quaternary ammonia compounds (Quat), hydrogen peroxide, chlorine, chloramines, chlorinated organics, surfactants, such as anionic surfactants, and other such chemicals and/or cleaning compounds found in the wastewater effluent from livestock, meat, and/or food processing plants. Exemplary anionic surfactants include, but are not limited to, sodium stearate, tallowate, palmate, cocoate, and alkybenzyene (xylene) sulfonates, such as dodecyl benzene sulfonate, and the like. Various chlorinated compounds are utilized in the industry as disinfectants. Exemplary chlorinated compounds are listed in Table 1, below.

TABLE 1

| Oxidation state | Name | Formula | Characteristic compounds |
|---|---|---|---|
| −1 | chlorides | $Cl^-$ | ionic chlorides, organic chlorides, hydrochloric acid |
| 0 | chlorine | $Cl_2$ | elemental chlorine |
| +1 | hypochlorites | $ClO^-$ | sodium hypochlorite, calcium hypochlorite, dichlorine monoxide |
| +3 | chlorites | $ClO_2^-$ | sodium chlorite |
| +4 | chlorine(IV) | $ClO_2$ | chlorine dioxide |
| +5 | chloryl, chlorates | $ClO_3^-$, $ClO^{+2}$ | potassium chlorate, chloric acid, dichloryl trisulfate $[ClO2]_2[S_3O_{10}]$. |
| +6 | chlorine(VI) | $Cl_2O_6$ | dichlorine hexoxide (gas). In liquid or solid disproportionates to mix of +5 and +7 oxidation states, as ionic chloryl perchlorate [ClO2] + [ClO4] |
| +7 | perchlorates | $ClO_4^-$ | perchloric acid, perchlorate salts such as magnesium perchlorate, dichlorine heptoxide |

Studies have been conducted and reported in the literature regarding the biocidal activities and toxicities of these commonly employed wastewater treatment compounds. Thus, it is known in the art that, for instance about 0.5 mg/L-d of PAA or Quat under anaerobic conditions, and about 5 and about 2.5 mg/L-d under aerobic conditions, respectively, is sufficient to cause toxic effects on downstream industrial biological wastewater treatment regimes. A cumulative dose of about 25 mg/L of PAA or Quat under anaerobic conditions (5 mg/L-d under aerobic conditions) is sufficient to result in toxicity or biocidal activity in downstream biological wastewater treatment regimes including inhibition of nitrification. About 2.5 mg/L-d of Quat can inhibit Chemical Oxygen Demand (COD) removal. Additionally, it is known, for instance, that about 10 mg/L-day of chlorine compounds under anaerobic conditions, and 50 mg/L-d under aerobic conditions, can cause toxicity in downstream industrial biological wastewater treatment regimes, or a cumulative amount of about 200 mg/L of chlorine compounds. Dodecyl benzyl sulfonate (DDBS) surfactants at about 10 mg/L-day or about 40 mg/L total cumulative dose under anaerobic conditions can trigger toxicity in downstream industrial biological wastewater treatment regimes.

The processes, methods, and systems disclosed herein function as a buffer or protective system for removal of the toxic or inhibitory substances from the wastewater prior to entry into, and further processing by, biological treatment methodologies that include, for instance, anaerobic, anoxic, or aerobic suspended growth activated sludge processes; anaerobic, anoxic, or aerobic fixed growth, IFAS, Moving Bed BioReactor (MBBR) or Membrane Bioreactor (MBR) processes; anaerobic lagoons; anaerobic fluidized bed or fixed bed processes; and/or, anaerobic sludge digestion processes. These are commonly employed for biochemical oxygen demand (BOD) removal, ammonia removal, total nitrogen removal, and phosphorus removal. Such biological treatment methodologies employ and depend on the live bacterial cultures present in reactors to chemically transform wastewater contaminants into less toxic substances, thereby purifying, clarifying, and decontaminating wastewater. Without the microbes in such systems, the downstream treatment plants do not function. Thus, the toxic substances released by such animal, livestock, and food processing plants can effectively inhibit beneficial downstream treatment through biological wastewater methodologies.

The described solution is therefore an intermediary step in the overall process of wastewater generation, treatment, and release from such processing plants. The overall process includes the following stages: 1) wastewater generation by the processing plant that includes toxic contaminates related to decontamination systems operating within the processing plant as noted above, 2) release of the wastewater into a wastewater processing system that often includes, for example, a screening step, a flow equalization step achieved by using a flow equalization tank, a dissolved air flotation step for fat and solids removal, 3) biological treatment to reduce BOD nitrogen, and phosphorous, 4) ultraviolet (UV) irradiation and/or chlorine effluent disinfection, and 5) release of the treated wastewater into the public water table or system. The processes, methods, and systems described herein operate between steps 2 and 3, such that the wastewater effluent from step 1 can be easily and economically treated using biological wastewater treatment systems in step 2.

The disclosed processes, methods, and systems make use of commonly employed devices already present in processing plant wastewater treatment systems, such as the Dissolved Air Flotation (DAF) wastewater pretreatment processes. Such DAF are either retrofitted, upgraded, or replaced according to the disclosed processes, methods, and systems. Prior to entering DAF systems, effluent from the animal, livestock, and food processing plants is treated by addition of flocculants and coagulant. Standard coagulants include, for instance, ferric chloride, aluminum chloride, and aluminum sulfate. Standard flocculants include, but are not limited to, anionic flocculants such as copolymers of acrylamide and acrylic acid, as well as cationic flocculants such as copolymers of N,N-dimethylaminoethyl acrylate methyl chloride quaternary (AETAC), N,N-dimethylaminoethyl methacrylate methyl chloride quaternary (METAC), and acrylamide.

In a standard DAF system, recycle flow is pressurized by a recycle pressurization pump to about 100 psi and a small amount of air (1 to 4 scfm) is injected into the recycle flow. The high pressure of the DAF is needed to "dissolve" or "supersaturate" the air in the pressurized pumped flow and ensures mixing of air and influent wastewater flow into the DAF cell. The injected air supersaturates (dissolves) in the pressurized recycle flow (RF). When the RF enters the DAF cell unit the pressurization is "released" (drops to approximately atmospheric pressure) so that the "dissolved air" escapes from the solution in very tiny air bubbles that float the chemically treated wastewater solids and fat/oils/grease to the surface of the DAF cell for removal by a skimmer mechanism. DAF systems are commercially available from, for example, World Water Works, Oklahoma City, Okla., US. DAF cells often include such components as a float skimmer, float discharge, screw auger driver and screw auger, settled solids outflow, sand trap outflow, one or more inlets, and one or more effluent outflow ports.

Most DAF cell wastewater treatment systems typically have a recycle pressurization system that includes one or more recycle flow pressurization pumps, pump suction and discharge piping, a recycle flow force main back to the inlet end of the DAF cell, a compressed air or suction air system for air injection into the recycle flow, air pressure and air flow rate controls, recycle pump pressure monitoring controls, and the like that are known in the art as common components of a DAF cell system. DAF cells and other components of such wastewater treatment systems are commercially available from numerous manufacturers, such as FRC Environmental, Inc., Gainesville, Ga., US.

In such DAF systems, the recycle flow is pressurized typically from about 40 psi up to approximately 100 psi by operation of the recycle pressure pumps. Typically, a pressurized or induction air flow rate for about 0.50 scfm to about 5 scfm is used on a DAF cell operation. As noted above, this increased pressure causes air volume injected into the wastewater to be forced into solution, super saturated into, and completely mixed with, the pressurized recycle flow. This recycle flow is typically pumped through a short force main into the inlet of the DAF cell to be dispersed into and completely mixed with the chemically treated DAF cell influent wastewater flow.

Commercially available chemical treatments for neutralization of wastewater toxins and biocides are available and all such known suitable chemical treatment regimens are contemplated herein. Chemical neutralization systems are designed to neutralize the various toxic and biocidal compounds commonly used in meat, livestock, and food processing plants, as listed above. Thus, neutralization chemicals, known in the art, are adept at neutralizing, for instance PAA. PAA is known to be neutralized by addition of, for example, sodium thiosulfate or sodium metabisulfite. These chemicals can drain hydrogen peroxide from the system, thereby disturbing the equilibrium of PAA with water. In another example, known chemicals, such as anionic monoalkyl surfactants such as sodium lauryl sulfate, can react with Quat compounds that contain two methyl groups, thereby neutralizing the Quat compounds. Other exemplary neutralization chemicals include, but are not limited to, sodium thiosulfate, sodium metabisulfite, hydrogen sulfide, and sulfur dioxide, and the like that are known to neutralize chlorine compounds.

Such neutralization chemicals are commonly dosed and mixed into the DAF cell influent flow for dispersal and neutralization of toxic components prior to entry of the wastewater into biological treatment systems. However, some neutralization chemicals, upon dosing and mixing into the DAF can interfere with coagulants and flocculants normally dosed into and used for treatment of the wastewater flow prior to entering the DAF cell for flotation and removal of chemically treated wastewater pollutants. That is, while normally one treats wastewater effluent with coagulants and flocculants prior to release into other streams, addition of some additional chemical treatment systems into the DAF is incompatible and can cause formation of solids in the DAF. Without wishing to be bound by any specific theory, the formation of solids in the DAF is believed to be due to contaminants present in the wastewater upstream of the DAF cell. The wastewater flowing out from processing plants often contains high concentrations of solids, oils, and grease, as well as various coagulants and flocculants that were dosed into the wastewater upstream of the DAF cell. Consequently, the much higher concentration of wastewater solids and chemical treatment solids found upstream of the DAF can interfere with any additional wastewater process treatment chemicals, such as neutralization chemicals, added for further downstream processing and polishing of wastewater.

However, effluent from the treated DAF cell contains much lower suspended and colloidal solid concentrations than the wastewater entering the DAF cell. Thus, part of the disclosed processes, methods, and systems includes addition of wastewater neutralization chemicals instead to the DAF cell effluent flow. Here, neutralization chemicals are most efficient because they are added to treated wastewater containing lower concentration of suspended solids.

Further, neutralization chemicals for wastewater treatment can yield floating solids that are not desirable for downstream wastewater treatment processes. That is, neutralization chemicals added to DAF cell effluent wastewater can result in the production of additional solids that accumulate in, and is detrimental to, downstream biological treatment processes. The presently disclosed processes, methods, and systems provide for efficient and economical removal of these solids produced by the neutralization chemicals since the solids are removed by flotation in the DAF cell. The ability to remove the solids is further achieved by thorough mixing of the neutralization chemicals used to treat the DAF effluent with the recycled flow. Thorough mixing of the neutralization chemicals is achieved by the DAF cell recycle flow piping system and influent wastewater flow piping that thoroughly mix the dosed neutralization chemicals in the recycle flow with the entire DAF cell influent wastewater flow.

Thus, problems associated with incompatibilities between flocculants, coagulants, and neutralization chemicals often found in processing plant wastewater are solved by dosing and thoroughly mixing the neutralization chemical regimens downstream of the DAF cell. This solution is achieved without adversely affecting the coagulation and flocculation process used to treat the wastewater at the plant, upstream of the DAF, and removal of the solids produced by reaction of wastewater treatment chemicals with other wastewater contaminants such as solids, oils, fats, and grease, is also achieved.

Presented therefore are methods, processes, and systems for solving this problem. The methods and processes include various steps aimed at addition of neutralization chemicals without triggering precipitation or coagulation of particles in the wastewater stream that could clog or incapacitate standard DAF cell systems. Also disclosed are systems that achieve this goal comprised of various standard components arranged in a specific manner that allows addition of chemical treatments without the aforementioned spurious and undesirable side effects. Such embodiments are described hereinbelow but are not in any manner intended to limit the disclosure to only these embodiments. One of skill in the art of wastewater treatment, or particularly biological wastewater treatment methodologies, would understand that additional variations are encompassed by this disclosure, such variations being immediately apparent to one of skill in the art.

Figure 1B:
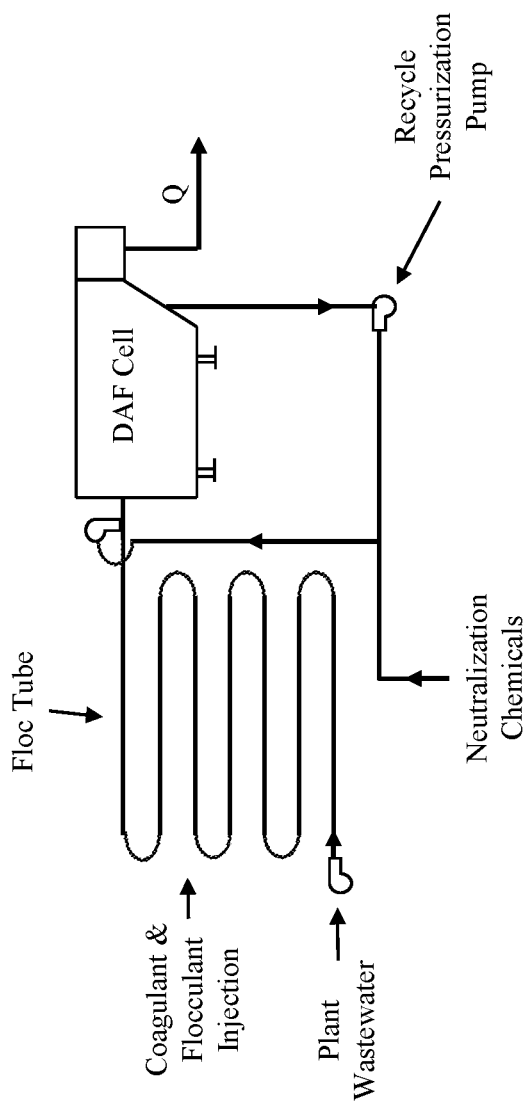
FIG. 1B provides a similar system but without the optional contactor pipeline.

In one embodiment of the disclosed wastewater treatment process and system, a floc tube is positioned downstream of the wastewater effluent from an animal, livestock, or food processing plant. The floc tube is adapted for injection of coagulants and flocculants and is followed downstream by a DAF cell (FIG. 1A and FIG. 1B). There is an outflow float discharge from the DAF cell (Q) as well as a second effluent outflow that proceeds to an optional pipeline contactor provided in the recycle pressurization line. (Compare FIG. 1A versus FIG. 1B). The pipeline contactor is adapted with a mechanism for dosing chemical treatment (neutralization chemicals, FIG. 1A). Alternatively, the neutralization chemicals are injected into the system downstream of the recycle pressurization pump (FIG. 1B). The outflow from the pipeline contactor connects upstream of the DAF cell creating a looped system. This provides thorough mixing and reaction of wastewater treatment chemicals with the pressurized DAF cell recycle flow that is pumped and recycled back into the inlet end of the DAF cell. Various pumps are provided in this embodiment, such as downstream of the DAF cell, upstream of the floc tube, and upstream of the DAF cell, etc. as needed. Injection of flocculant and coagulant as depicted in FIGS. 1A and 1B is achieved by any method known in the art. Many different ports are commercially available and adaptable to the floc line to allow for addition of such chemicals. Chemical neutralizer means the chemical treatments discussed above that act to neutralize biocidal and toxic chemicals commonly found in processing plant wastewater. In this embodiment, and the embodiments that follow, the flocculant and coagulant can be added in any order. For instance, the coagulant can be added upstream of the flocculant, in the floc tube, or vise versa. Further, more than one flocculant and/or coagulant can be added. Mixtures of both can be added at different points using injectors and ports known in the art, at various points in the floc tube.

Figure 2:
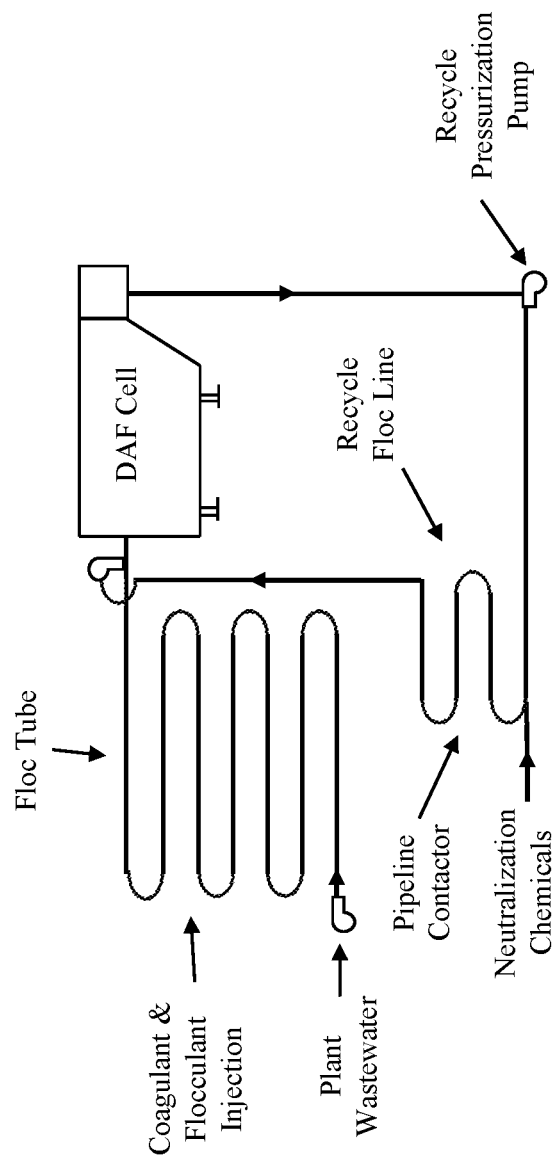
FIG. 2 is a schematic representation of an embodiment of the wastewater treatment process and system that does not include a pipeline contactor or mixing tank, where the neutralization chemicals are dosed directly into a DAF cell recycle pressurization line for mixing and blending with influent wastewater at the inlet of the DAF cell.

In another embodiment similar to the system and process depicted in FIGS. 1A and 1B, there is no pipeline contactor or contactor tank (see below for further description of contactor tank). The neutralization chemicals are dosed directly into the DAF cell recycle pressurization line for mixing and blending with influent wastewater at the inlet of the DAF cell (FIG. 2). This system optionally further comprises a pipeline contactor (not pictured) downstream of the neutralization chemical feed injection port but upstream of the DAF cell. The optional pipeline contactor is connected to an existing recycle pressurization piping for mixing and contact of DAF cell effluent recycle pressurization flow with neutralization chemical.

Figure 3:
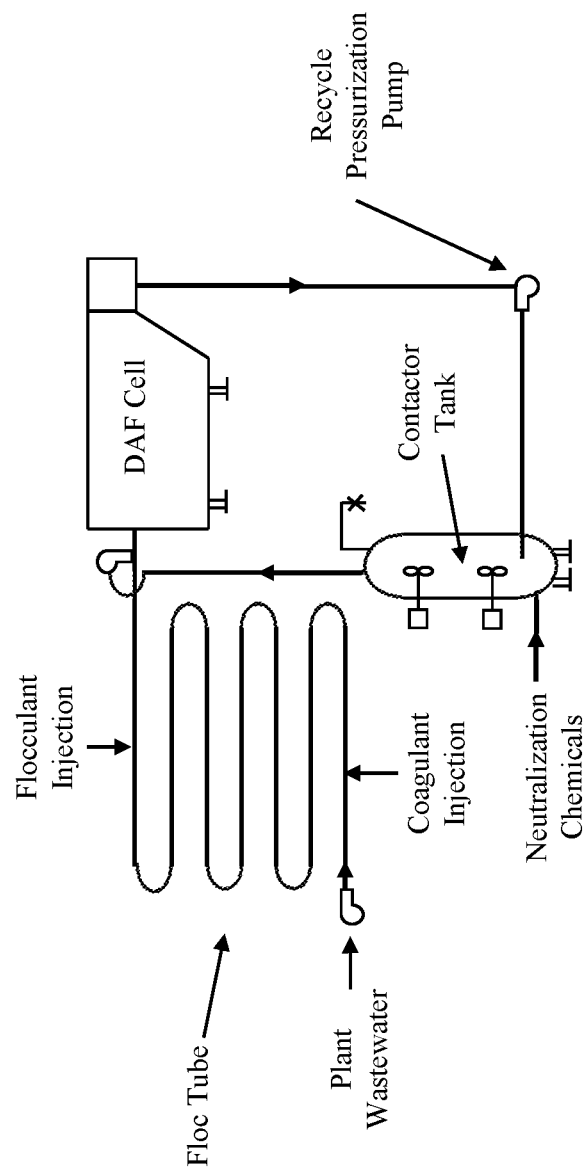
FIG. 3 is a schematic representation of an embodiment of the wastewater treatment process and system that has a contactor tank in the recycle pressurization line for dosing, thoroughly mixing, and reaction of the wastewater neutralization chemicals with the pressurized DAF cell recycle flow.

In a further embodiment, a longer pipeline contactor is included in the recycle pressurization line for dosing, thoroughly mixing, and reaction of the wastewater neutralization chemicals with the pressurized DAF cell recycle flow (FIG. 3). Here is also depicted optionally a pipeline contactor tank. The contactor tank serves the same purpose as the pipeline contactor, allowing thorough mixing of neutralization chemicals with DAF cell effluent. The contactor tank optionally comprises one or mixing devices, such as propeller devices (two horizontal propeller type mixing devices are depicted with external controller boxes in FIG. 3), or other suitable mixing devices known in the art. In this embodiment, flocculant is added to the system just upstream of the DAF cell, and coagulant is added just downstream of the wastewater from the processing plant and in the first part of the floc tube.

Figure 4:
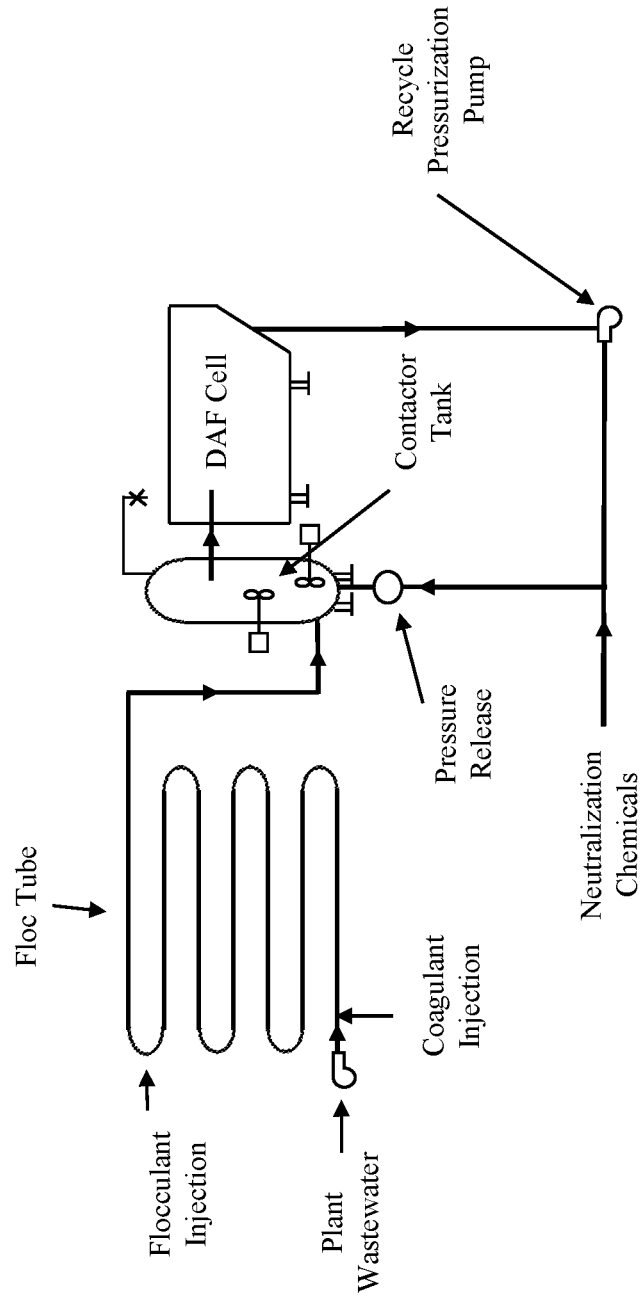
FIG. 4 is a schematic representation of an embodiment of the wastewater treatment process and system with a contact tank in the recycle pressurization flow for dosing, thoroughly mixing, and reaction of the wastewater neutralization chemicals with the pressurized DAF cell recycle flow.

An additional exemplary embodiment is depicted in FIG. 4 that also comprises a contact tank in the recycle pressurization flow for dosing, thoroughly mixing, and reaction of the wastewater neutralization chemicals. The contact tank mixes the neutralization chemicals with the pressurized DAF cell recycle flow. This embodiment is similar to the previous embodiment except that the contactor tank is positioned just upstream of the DAF cell, rather than downstream of the DAF cell. There is optionally a pressure release mechanism just upstream of the contactor tank.

Figure 5:
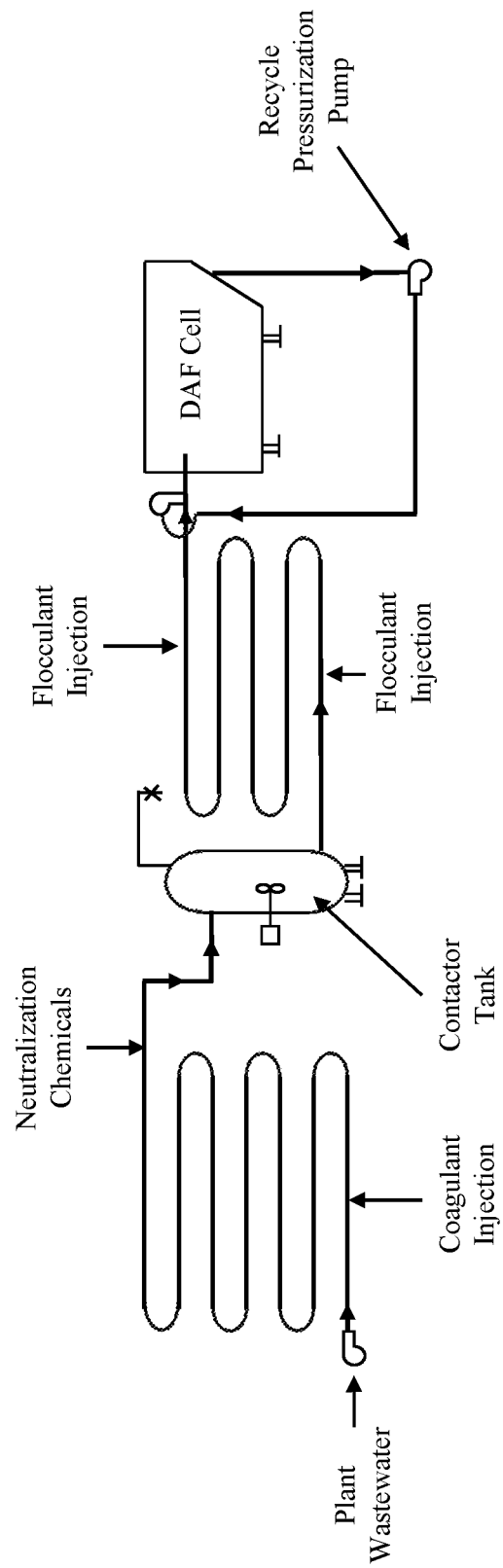
FIG. 5 is a schematic representation of an embodiment of the wastewater treatment process and system with a contact tank used for mixing and blending the chemically treated influent wastewater flow and the chemically treated recycle pressurization flow upstream of the DAF flow inlet. The contact tank is located between two floc tubes where coagulation, flocculation, and neuralization chemicals can be added where shown.

In another embodiment of the system, there are two floc tubes, one upstream of the contactor tank (floc tube one) and one downstream of the contactor tank (floc tube two, FIG. 5). The first floc tube in this embodiment is used for dosing of the neutralization chemicals downstream of dosing of the coagulant. In this manner, for instance, two flocculants are added into floc tube two. The second flocculant can be the same as, or different from, the first flocculant, or different or identical mixtures of several flocculants can be added to floc tube two, etc. In this embodiment, the recycle pressurization line is fed back into a point just preceding the second DAF cell instead of back into the contactor tank.

Figure 6:
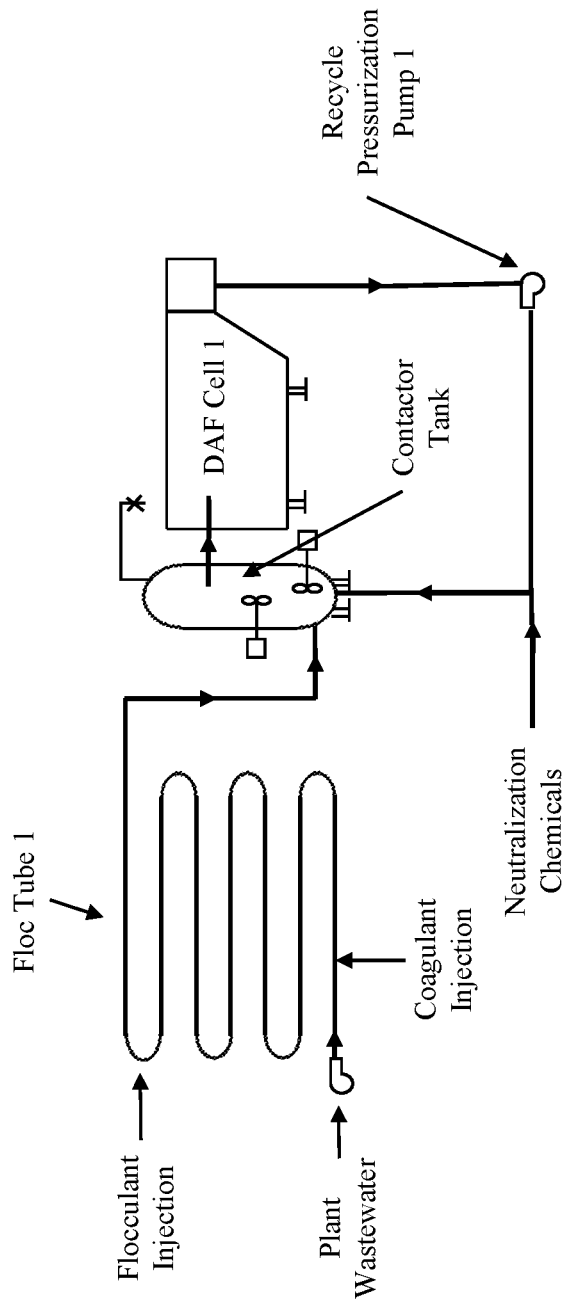
FIG. 6 is a schematic representation of an embodiment of the wastewater treatment process and system with a contact tank used for mixing and blending the wastewater treatment chemicals and the influent wastewater flow treated with coagulant. In this embodiment, the polymer flocculant is dosed upstream of the contact tank into a pipeline or pipeline flocculator located upstream from the neutralization chemical treatment and the DAF cell inlet.

As in FIG. 4, FIG. 6 depicts an embodiment of the system in which a contactor tank is used for mixing and blending the chemically treated influent wastewater flow and the chemically treated recycle pressurization flow upstream of the DAF flow inlet. However, in this system, as with the system described for FIG. 4, the contactor tank is positioned immediately upstream of the DAF cell and there is only a single floc tube. In this embodiment, coagulant is added just downstream of the processing plant wastewater inlet, and flocculant is added just upstream of the DAF cell. Neutralization chemicals are injected into the system just upstream of the contactor tank in this embodiment.

Figure 7:
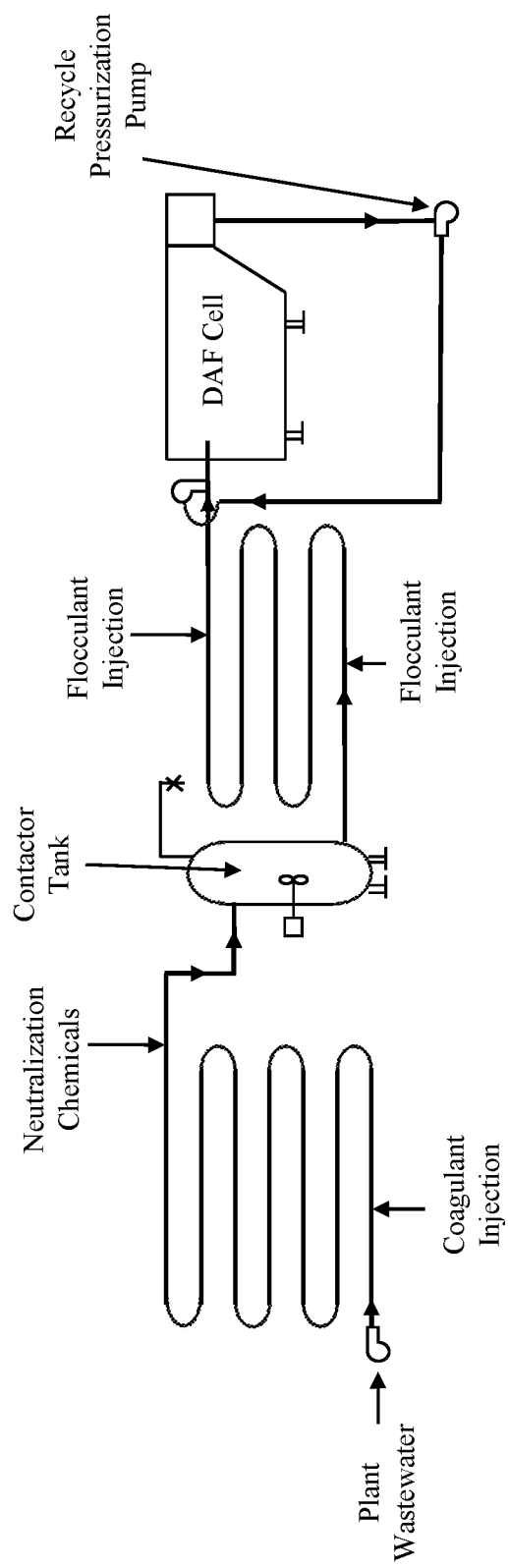
FIG. 7 is a schematic representation of an embodiment of the wastewater treatment process and system with a contact tank used for mixing and blending the chemically treated influent wastewater flow and the chemically treated recycle pressurization flow upstream of the DAF flow inlet. The contact tank is located between two floc tubes where coagulation, flocculation, and neuralization chemicals can be added where shown.

Another embodiment of the system is provided in FIG. 7 wherein a contactor tank is used for mixing and blending the wastewater treatment chemicals and the influent wastewater flow treated with coagulant, but not with polymer flocculant. In this embodiment, the polymer flocculant is dosed downstream of the contactor tank into a pipeline or pipeline flocculator located between the chemical treatment contact tank and the DAF cell inlet.

Figure 8:
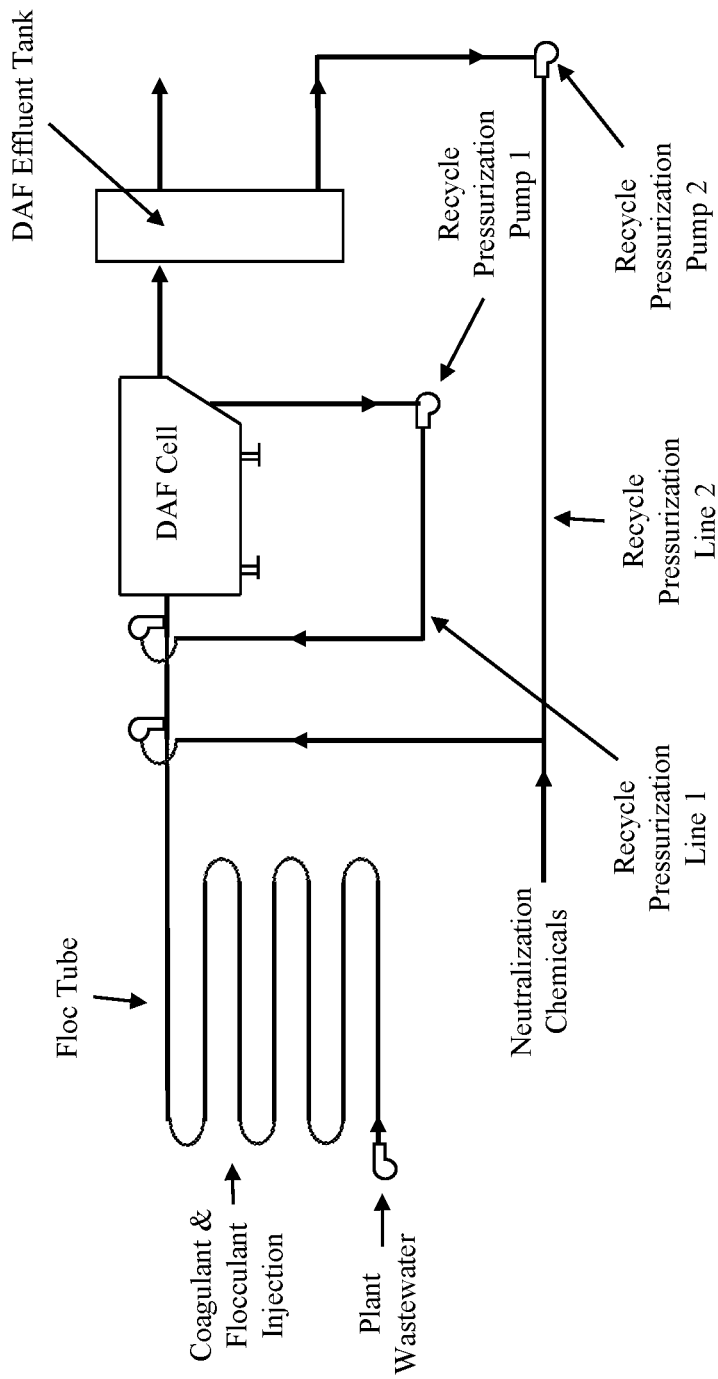
FIG. 8 is a schematic representation of an embodiment of the wastewater treatment process and system in which the DAF cell recycle pressurization flow is not used to inject wastewater treatment chemicals. Instead, a separate DAF cell effluent recycle flow is used to inject wastewater treatment chemicals. Here, a DAF cell effluent tank, DAF cell effluent recycle pump #2 and DAF cell effluent recycle line #2 with the wastewater chemical treatment injection point in the recycle line that runs back to the inlet of the DAF cell to be mixed and blended with the chemically treated influent wastewater flow. In this embodiment, recycle pump #2 and recycle line #2 are not used for pressurization of recycle flow and for air dissolution. The wastewater treatment chemicals are injected into this non-pressurized (low pressure) recycle line. Recycle pump #1 and recycle line #1 are part of the recycle pressurization system used for the dissolved air flotation process.

Finally, FIG. 8 provides a schematic representation of an embodiment of the wastewater treatment process and system in which the DAF cell recycle pressurization flow is not used to inject neutralization chemicals. Instead, a separate DAF cell effluent recycle flow is used to inject wastewater neutralization chemicals. Here, the system includes a DAF cell effluent tank, DAF cell effluent recycle pump #2, and a DAF cell effluent recycle line #2 including a wastewater neutralization chemical injection point in the recycle line #2 that runs back to the inlet of the DAF cell to be mixed and blended with the influent wastewater flow that has been treated with neutralization chemicals. In this embodiment, recycle pump #2 and recycle line #2 are not used for pressurization of recycle flow and for air dissolution. The wastewater neutralization chemicals are injected into this non-pressurized (low pressure) recycle line. Recycle pump #1 and recycle line #1 are part of the recycle pressurization system used for the dissolved air flotation process.

Flow rates that are typical for treatment of wastewater flows are from about 50 gpm to about 5000 gpm. Exemplary coiled Floc Tubes are about 8 ft. to 20 ft. long by about 3 ft. to 6 ft. wide and about 4 ft. to 10 ft. high, with the coiled pipes installed on a support rack. Typical, but not limiting, pipeline flocculation pipe lengths range from about 100 ft. to 200 ft. However, larger systems are contemplated with longer pipe lengths, as well as smaller systems.

All publications, patents and patent applications cited in this specification are herein incorporated by reference, and for any and all purpose, as if each individual publication, patent or patent application were specifically and individually indicated to be incorporated by reference. In the case of inconsistencies, the present disclosure will prevail.

The embodiments described hereinabove are further intended to explain best modes known of practicing it and to enable others skilled in the art to utilize the disclosure in such, or other, embodiments and with the various modifications required by the particular applications or uses. Accordingly, the description is not intended to limit it to the form disclosed herein. Also, it is intended that the appended claims be construed to include alternative embodiments.

What is claimed is:

1. A method for wastewater treatment, which comprises:
providing a wastewater outflow from a livestock, animal, or food processing plant, wherein the wastewater outflow comprises one or more contaminants, and wherein the contaminants are peracetic acid (PAA), quaternary ammonia compounds (Quat), hydrogen peroxide, chlorine, chloramines, chlorinated organics, surfactants, and combinations thereof;
injecting the wastewater outflow into a floc tube,
adding at least one of a coagulant and a flocculant to the floc tube,
directing the wastewater from the floc tube to a Dissolved Air Flotation (DAF) cell to form a DAF water effluent,
adding one or more neutralization chemicals that neutralize the one or more contaminants to a first portion of the DAF water effluent,
directing the DAF cell effluent first portion containing said one or more neutralization chemicals back to the DAF cell,
wherein a second portion of the DAF cell effluent is a clarified wastewater product,
wherein the amount of contaminants in the wastewater is higher than the amount of contaminants present in the clarified wastewater product, and
wherein little or no precipitation or coagulation occurs in the DAF cell effluent as a result of addition of the one or more neutralization chemicals.

2. The method of claim 1, wherein the one or more neutralization chemicals include one or more of a sulfur-containing compound, and/or an anionic mono-alkyl surfactants.

3. The method of claim 2, wherein the sulfur-containing compound is sodium thiosulfate, sodium metabisulfite, hydrogen sulfide, and/or sulfur dioxide.

4. The method of claim 2, wherein the anionic mono-alkyl surfactant is sodium lauryl sulfate.

5. The method of claim 1, wherein the surfactant is one or more of sodium stearate, tallowate, palmate, cocoate, and/or an alkybenzyene (xylene) sulfonate.

6. The method of claim 1, wherein after adding one or more neutralization chemicals to the DAF cell effluent first portion, the effluent first portion is directed into a pipeline contactor or a contactor tank and then recycled back to the DAF cell.

7. The method of claim 6, wherein the contactor tank is positioned immediately upstream of the DAF cell and downstream of the floc tube, and wherein neutralization chemicals are added to the DAF cell effluent prior to entering the contactor tank.

8. The method of claim 1, after adding one or more neutralization chemicals to the DAF cell effluent first portion, the effluent first portion is directed into an additional floc tube and then recycled back to the DAF cell.

9. The method of claim 1, wherein before entering the floc tube, the wastewater is first subjected to a screening step, followed by a flow equalization step, and effluent then directed to a DAF cell.

10. The method of claim 1, wherein the clarified wastewater product from the DAF cell is directed to one or more biological wastewater treatment methods to provide further clarified wastewater product.

11. The method of claim 10, wherein the one or more biological wastewater treatment methods is one or more of anaerobic, anoxic, or aerobic suspended growth activated sludge processes; anaerobic, anoxic, or aerobic fixed growth, integrated fixed-film activated sludge (IFAS), Moving Bed BioReactor (MBBR) or Membrane Bioreactor (MBR) processes; anaerobic lagoons; anaerobic fluidized bed or fixed bed processes; and/or, anaerobic sludge digestion processes.

12. The method of claim 10, wherein the one or more biological wastewater treatment methods measurably reduced the Biological Oxidation Demand (BOD), nitrogen, and/or phosphorous in the wastewater.

13. The method of claim 12, further comprising irradiating the wastewater with ultraviolet light or adding chlorine.

14. The method of claim 13, further comprising release of the further clarified wastewater product into a public water system.

15. The method of claim 1, wherein DAF cell effluent is directed into a DAF eluent tank, wherein said first portion of the DAF effluent from the DAF effluent tank is recycled to a point upstream of the DAF cell, and wherein neutralization chemical is added to the DAF effluent tank effluent prior to recycling said first portion back to the DAF cell.

16. The method of claim 1, wherein the flocculant is one or more of anionic flocculant or cationic flocculant.

17. The method of claim 16, wherein the anionic flocculant is one or more of a copolymer of acrylamide and acrylic acid, or wherein the cationic flocculant is one or more of a copolymer of N,N-dimethylaminoethyl acrylate methyl chloride quaternary (AETAC), N,N-dimethylaminoethyl methacrylate methyl chloride quaternary (METAC), and acrylamide.

18. The method of claim 1, wherein the coagulant is one or more of aluminum chloride, ferric chloride, ferric sulfate, aluminum sulfate solution, polyaluminum chloride, and bentonite clay.

* * * * *

UNITED STATES PATENT AND TRADEMARK OFFICE
CERTIFICATE OF CORRECTION

| | |
|---|---|
| PATENT NO. | : 10,858,274 B2 |
| APPLICATION NO. | : 15/933116 |
| DATED | : December 8, 2020 |
| INVENTOR(S) | : John H. Reid |

It is certified that error appears in the above-identified patent and that said Letters Patent is hereby corrected as shown below:

In the Claims

In Column 13:
Line 40: Claim 2 delete "tants." and insert -- tant. -- therefor.

In Column 14:
Line 37: Claim 15 delete "eluent" and insert -- effluent -- therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*